United States Patent
Young et al.

(10) Patent No.: US 6,565,041 B1
(45) Date of Patent: May 20, 2003

(54) PARACHUTE ASSEMBLY FOR A MINIATURE AIRCRAFT

(75) Inventors: Eric P. Young, Pasadena, CA (US); John Reynolds, Stevenson Ranch, CA (US); Mathew Curran, Lancaster, CA (US); Danny Gast, Lancaster, CA (US); Joseph Wurts, Valencia, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/028,956

(22) Filed: Dec. 27, 2001

(51) Int. Cl.$^7$ ................................................. B64D 17/80
(52) U.S. Cl. ..................................................... 244/139
(58) Field of Search ................................ 244/139, 149; 446/50

(56) References Cited

U.S. PATENT DOCUMENTS

| | | | | |
|---|---|---|---|---|
| 1,909,445 A | * | 5/1933 | Ahola | 244/139 X |
| 1,938,853 A | * | 12/1933 | Miller | 244/139 |
| 3,395,881 A | * | 8/1968 | Markham et al. | 244/139 |
| 3,463,425 A | * | 8/1969 | Hibi | 244/139 |

* cited by examiner

Primary Examiner—Robert P. Swiatek
(74) Attorney, Agent, or Firm—Bracewell & Patterson, L.L.P.

(57) ABSTRACT

A parachute system for a miniature aircraft having a storable parachute mounted on an upper surface of the aircraft. The system includes a canopy having a stored condition and an expanded condition. A plurality of suspension lines have first ends connected to the periphery of the canopy and second ends connected to an elastic member. First and second risers are connected by their first ends to the upper surface of the aircraft between the front end and center of gravity on either side of the longitudinal axis and by their second ends to the elastic member. A restraint system releasably restrains the parachute in the stored condition on the top surface of the aircraft; and a release system coupled to the restraint system releases the parachute upon command such that aerodynamic forces will cause the parachute to open.

29 Claims, 4 Drawing Sheets

FIG. 3
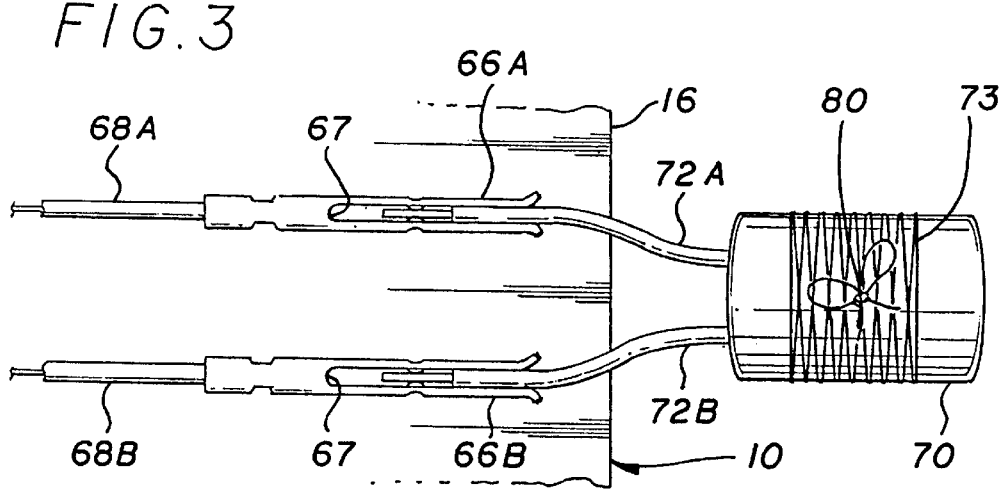
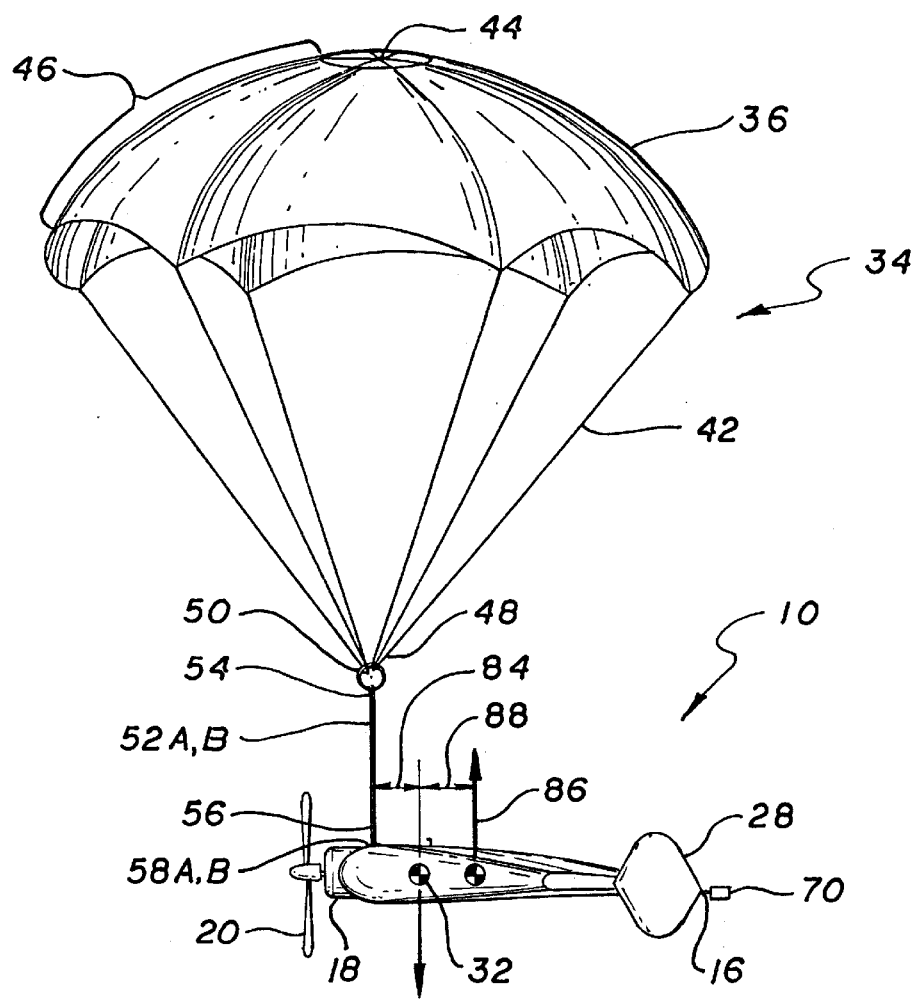
FIG. 9

PARACHUTE ASSEMBLY FOR A MINIATURE AIRCRAFT

BACKGROUND OF THE INVENTION

1. Field of the Invention

The invention relates to the field of parachute recovery systems for aircraft and the like and, in particular, to a parachute recovery system for an ultra-miniature aircraft.

2. Description of Related Art

There are numerous obvious uses of parachutes: dropping of cargo from aircraft, landing spacecraft such as the Mercury, Gemini and Apollo spacecraft, braking systems for aircraft that are delayed after landing. The solid rocket motors on the space shuttle are lowered back down over the ocean using parachutes. In fact, parachutes have been used to lower aircraft to the ground. However, in all these vehicle applications, the parachute was internally stored within the vehicle. Most often drogue chutes were used to "pull" the main chute out into the air stream for deployment. Of course, on individuals and cargo dropped from aircraft, the parachute was externally mounted.

Scaling down these prior art systems for use on small micro-sized aircraft with wingspans of less than 15 inches has proven difficult, especially if they are to extremely compact and lightweight. In addition, providing a simple and reliable method of achieving release and deployment has also proven difficult, and the use of parachutes has been discounted. In fact, most such aircraft are recovered by making "belly" landings, which typically damage the airframe and, if used, the propeller. Landing gear are typically not used because of the unacceptable complexity or weight penalty. Thus various arresting systems have been tried, such as butterfly or volleyball nets. However, aside from the damage that typically occurs, the main difficulty with these schemes is flying the aircraft into the net.

Thus it is a primary object of the invention to provide a parachute recovery system for an extremely small aircraft.

It is another primary object of the invention to provide a parachute recovery system for an extremely small aircraft that can be externally stored on the aircraft.

It is a further object of the invention to provide a parachute recovery system for an extremely small aircraft that is inexpensive to manufacture.

It is a still further object of the invention to provide a parachute recovery system for an extremely small aircraft that employees a reliable and simple method to achieve deployment.

SUMMARY OF THE INVENTION

The invention is a parachute system for a miniature aircraft, the aircraft having a front end, a rear end, a longitudinal axis, a center of gravity and an upper surface. In detail, the parachute system is mounted in a stored condition on the upper surface of the aircraft and includes a canopy having a stored condition and an expanded condition. Preferably, the canopy is hexagonal in shape and is vented at its center. A plurality of suspension lines having first ends connected to the periphery of the canopy in a spaced relationship and second ends coupled to an elastic member. Preferably, the elastic member is in the form of a ring. First and second risers are connected by their first ends to the upper surface of the aircraft between the front end and center of gravity on either side of the longitudinal axis and by their second ends to the elastic member. The first ends of the first and second risers are attached to the upper surface of the aircraft at a point that will cause the aircraft to descend with the longitudinal axis of the aircraft horizontal to the ground when the canopy is deployed.

With the aircraft center of gravity known and center of drag located between the center of gravity and the rear end thereof; the parachute is attached to the aircraft at a point located between the front end and the center of gravity. The distance from the center of gravity of the parachute attach point is such that when the canopy is in the expanded condition, the moment about the center of gravity caused by the drag of the canopy is equal to the drag of the aircraft, as the aircraft falls.

A restraint system is provided to releasably restrain the parachute assembly in the stored condition on the top surface of the aircraft and a release system to cause the restraint system to release the canopy from the stored condition. The restraint system preferably includes a retention cable or thread extending from the rear of the aircraft forward over the canopy, which loops under hooks mounted to the upper surface of the aircraft on either side of the longitudinal axis just ahead of the folded canopy of the parachute assembly. The ends of cable are attached to the release system includes an electrically actuated squib to which the ends of cable are tied directly thereto.

Thus after powered flight has termninated, actuation of squib will burn through, releasing the folded canopy. Aerodynamic forces will cause the canopy to fly off the rear end of the aircraft and inflate. After inflation, the canopy will slow the aircraft and essentially stops all forward motion. Note that the elastic ring will greatly reduce the shock load on the aircraft as the canopy inflates. The attachment location of the risers will cause the aircraft to descend vertically to the ground.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

FIG. 3 is a partial view of the under side of the rear of the aircraft illustrating the squib used to initiate deployment of the parachute system.

FIG. 9 is a side view of the aircraft descending vertically downward while in a horizontal position.

DESCRIPTION OF THE PREFERRED EMBODIMENT

Figure 1:
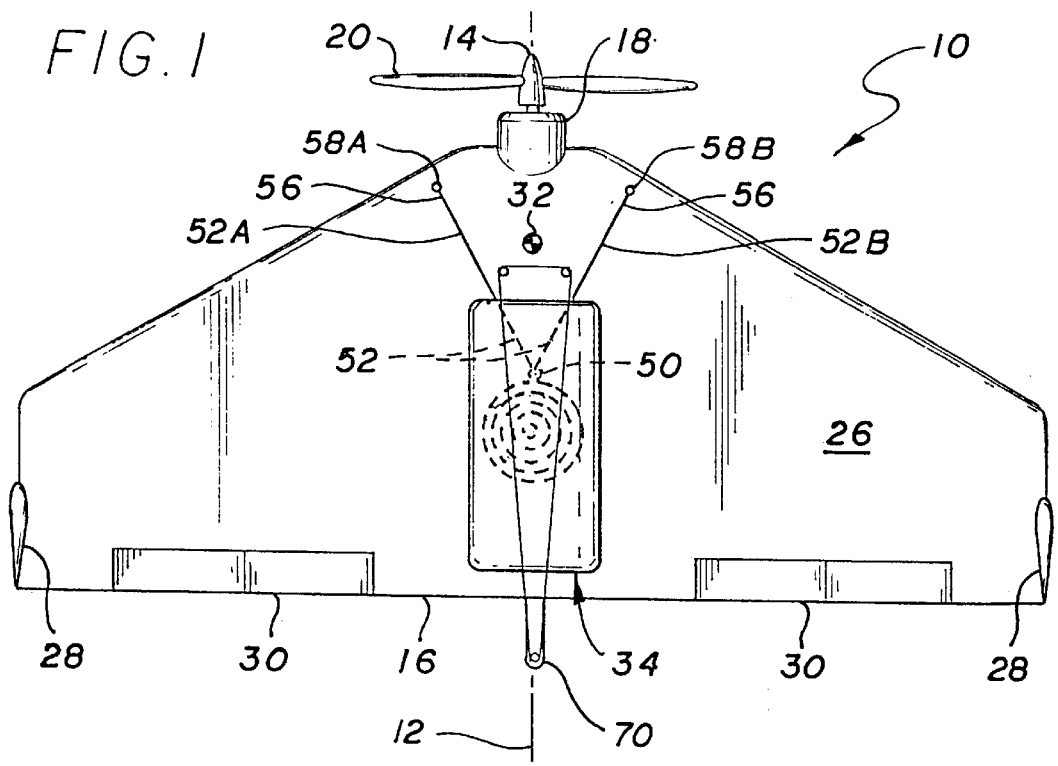
FIG. 1 is a top view of the aircraft illustrating the mounting of the parachute assembly.
Figure 2:
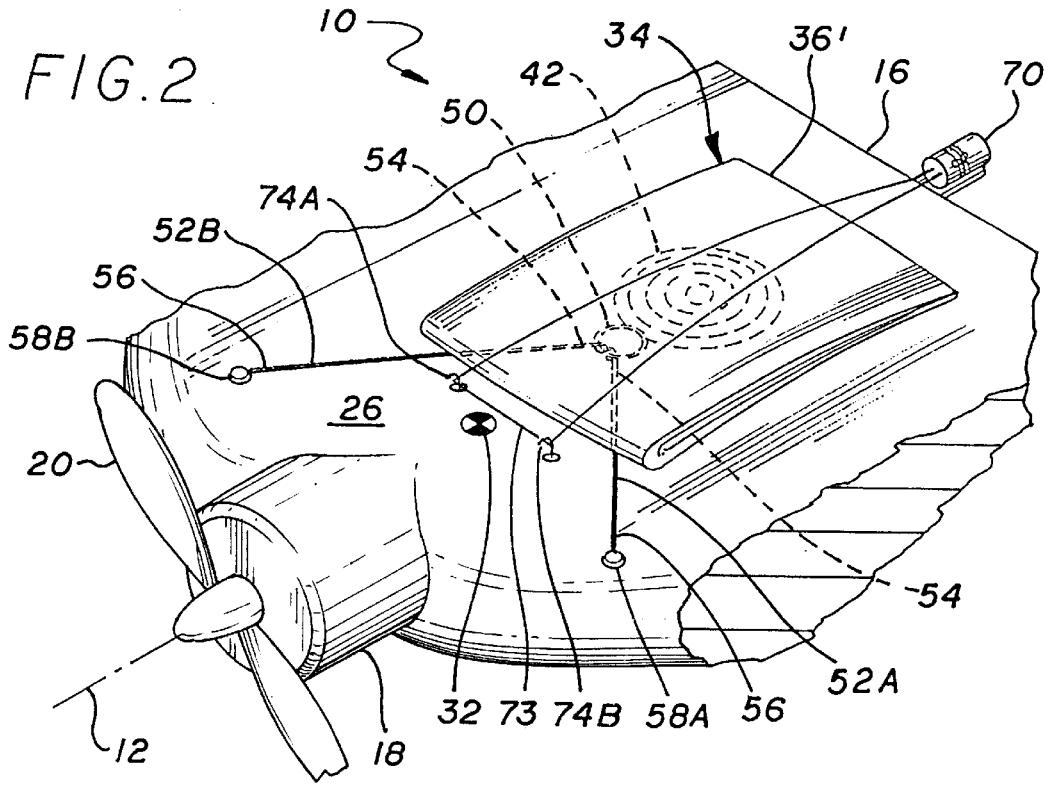
FIG. 2 is a partial perspective view of the aircraft shown in FIG. 1.

Referring to FIGS. 1–3, a radio-controlled aircraft, generally indicated by numeral 10 is disclosed and includes a longitudinal axis 12, nose 14, tail 16. A propulsion system 18 is located in the nose 14 having a propeller 20. Preferably, the propulsion system is an electric motor that is battery powered (not shown). The aircraft is a flying wing 26, with vertical stabilizers 28 and elevons 30. The center of gravity is located along the longitudinal axis 12 at a point indicated by numeral 32.

Figure 4:
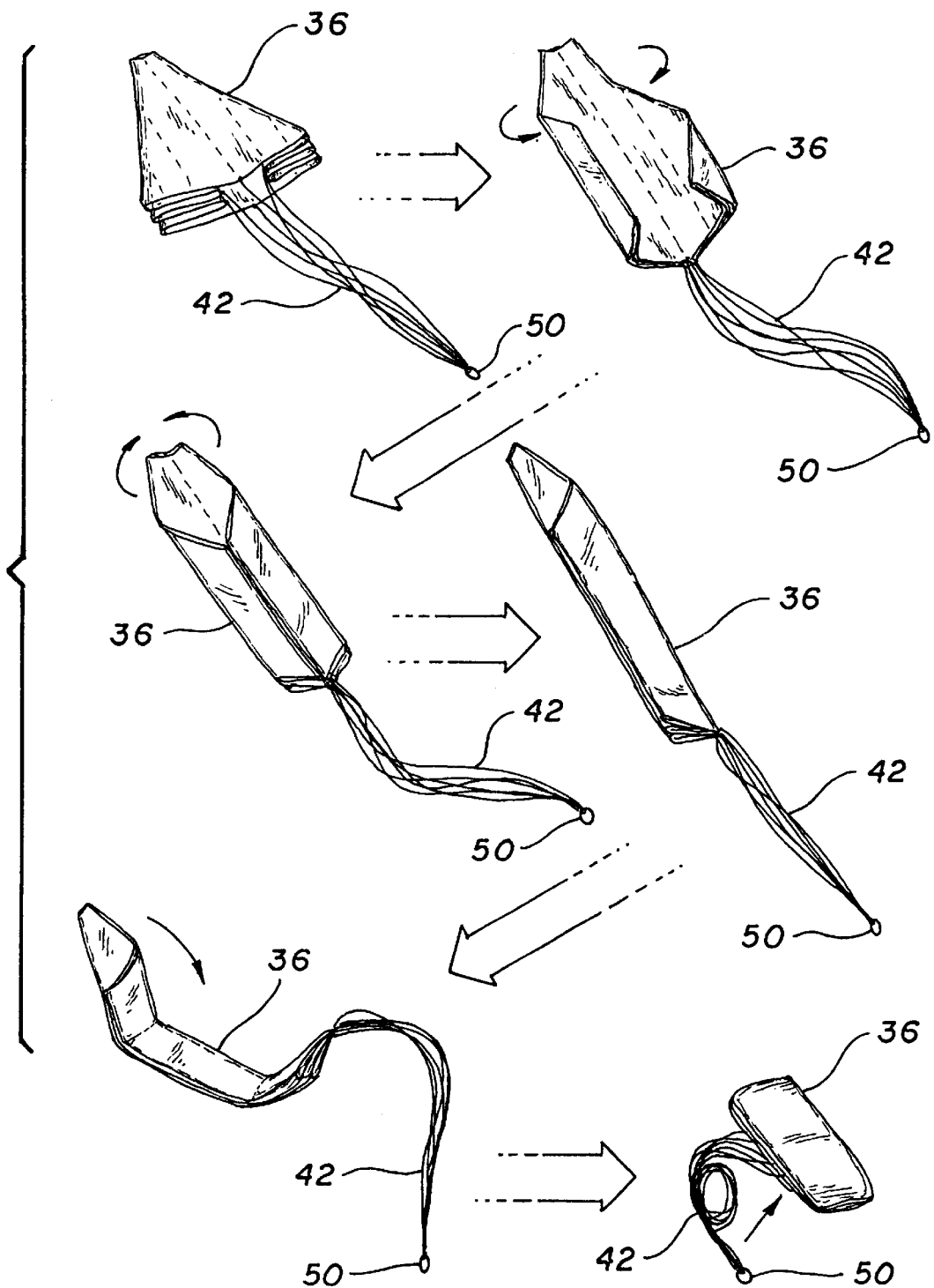
FIG. 4 is a series of perspective views of the procedure for folding the canopy.

Referring to FIGS. 1, 2 and additionally to FIG. 9, the aircraft 10 has a parachute assembly 34 that includes a canopy 36 made of lightweight nonporous material. The canopy 36, as illustrated, is six sided and includes a central vent for stability purposes and six suspension lines 42 joined together by their first ends 44 at the center of the vent. The suspension lines 42 are attached to the canopy 36 over a portion 46 of their length and at a second end 48 connect to a resilient ring shaped member 50. A pair of risers 52A and 52B are releasably connected by their first ends 54 to the resilient ring shaped member 50 and by their second ends 56 to fittings 58A and 58B. Preferably, the risers 52A and 58B are made of high strength KEVLAR® thread, although other light weight high strength materials are suitable. Referring to FIG. 4, the procedure for folding the canopy 36 and suspension lines 42 is illustrated. Once the canopy is folded, indicated by numeral 36' in FIGS. 1–3 and the suspension lines 42 coiled, the ends 56 of the risers 56A and 56B are connected to the member 50 by a spring clip (not shown) or are just tied thereto.

Referring to FIGS. 1–3, a pair of tubular electrical fittings 66A and 66B are mounted on the underside of the aircraft 10 at the rear and connected to electrical wires 68A and 68B, respectively, that in turn connect to a power source and switch mounted within the aircraft (not shown). The electrical fittings 66A and 66B include slots 67. A pyrotechnic squib 70 is connected to the fittings 66A and 66B via semi-rigid lead wires 72A and 72B that are inserted therein. The fittings 66A and 66B being split and the lead wires 72A and 72B being oversize, a clamping force is applied to the lead wires securing them in place. A cable or thread 73, preferably made of cotton, is run over the folded canopy 36' and through hooks 74A and 74B mounted on the upper surface of the aircraft 10 in front of the folded canopy with ends thereafter tied about the squib 70 in a knot 80.

Figure 5:
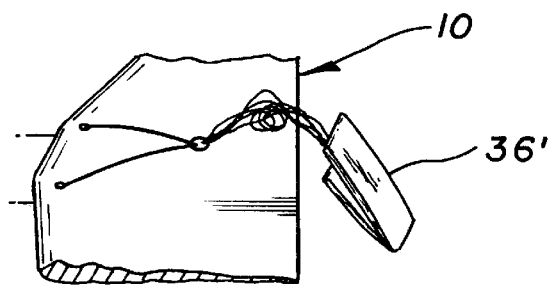
FIG. 5 is a perspective view of the aircraft with the parachute upon release.
Figure 6:
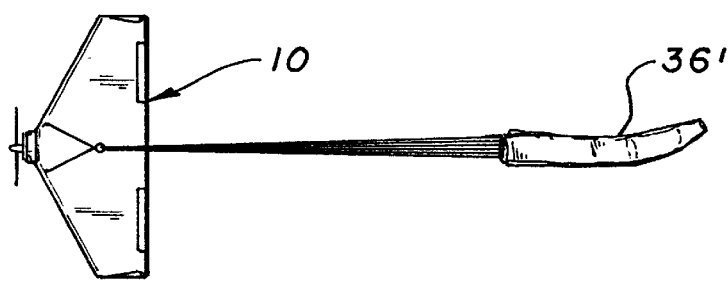
FIG. 6 is a perspective view of the aircraft with the parachute extended and starting to expand.
Figure 7:
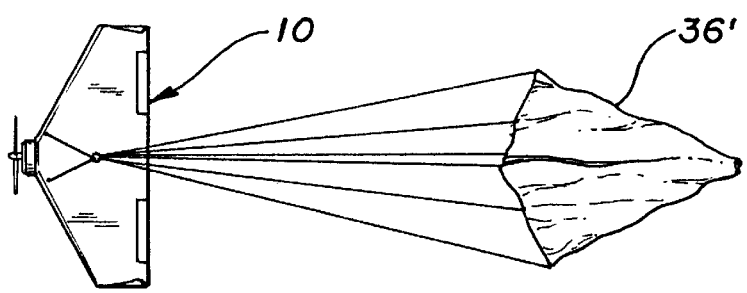
FIG. 7 is a perspective view of the aircraft with the parachute canopy starting to expand.
Figure 8:
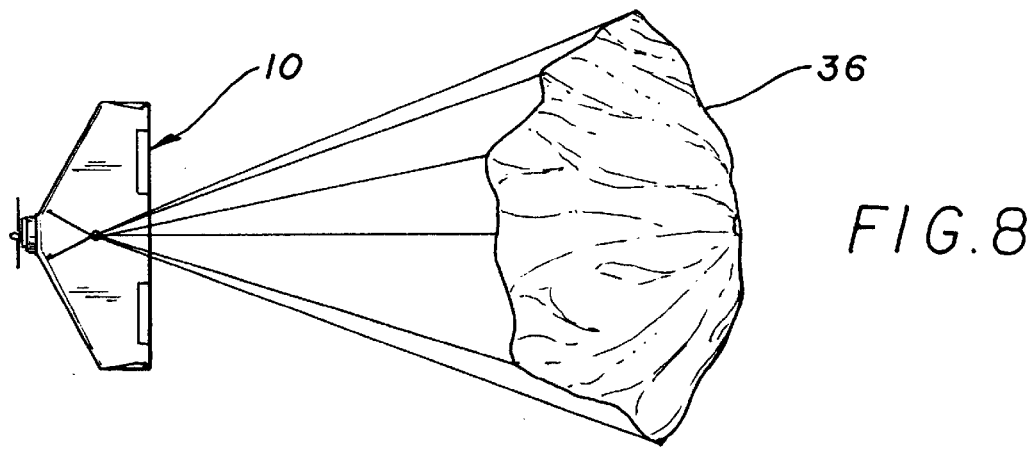
FIG. 8, is a perspective view of the aircraft with the parachute fully expanded.

The aircraft 10 is then ready for flight. When the aircraft's flight's mission has been completed and the aircraft has returned to "home base", the motor can be turned off and the squib 70 actuated by remote control. This will cause the thread 73 to burn through, allowing it to separate from the folded canopy 36'. Aerodynamic forces will then force the canopy 36' to extend rearward from the aircraft (FIGS. 5 and 6) and start to open (FIGS. 7 and 8). Once fully deployed, as illustrated in FIG. 9, the aerodynamic, drag will greatly increase and bring the aircraft to a virtual stop; at which point the aircraft will stall and start to fall. However, the position of the attachment points 58A and 58B of the risers 52A and 52B is selected to provide for a vertical descent with the aircraft 10 remaining horizontal as shown in FIG. 9. This will eliminate or greatly reduce damage to the aircraft, in particular the propeller 20.

The determination of the attach point of the parachute (distance indicated by numeral 84) from the center of gravity 32 is dependent upon the center of drag 86 distance from the center of gravity indicated by numeral 88. If horizontal descent is to be obtained, the torque produced by each must equal. The formulas for the forces produced by drag and the parachute are as follows:

$$F_p = C_p \times Q_p \times A_p$$

Where:
Fp=Drag force of parachute
Ap=Area of parachute
Q=Dynamic pressure
Cp=Parachute drag coefficient $$F_a = C_a \times Q_a \times A_a$$

Where:
Fa=Drag force of aircraft
Aa=Area of wing
Qa=Dynamic pressure
Ca=Aircraft drag coefficient In order to have a flat decent, the moments or torque sum about the center of gravity must be zero.

$$\Sigma f \times r = 0$$

$$(F_p = C_p \times Q_p \times A) \times R_p = (F_p = C_p \times Q_p \times A) F_p \times R_a$$

Where:
Rp=distance of parachute attach point from center of gravity
Ra=distance of center of aircraft drag from center of gravity $$R_p = Ra \times (C_a \times A_a)/(C_p \times A_p)$$

Thus with values of all the variables measurable, it becomes simple to determine the attach points for the parachute.

While the invention has been described with reference to a particular embodiment, it should be understood that the embodiment is merely illustrative, as there are numerous variations and modifications, which may be made by those skilled in the art. Thus, the invention is to be construed as being limited only by the spirit and scope of the appended claims.

INDUSTRIAL APPLICABILITY

The invention has applicability to the aircraft industry.

What is claimed is:

1. In an aircraft having a front end, a rear end, a longitudinal axis, a center of gravity and an upper surface, a storable parachute mounted on the upper surface of the aircraft comprising:

a canopy having a stored condition and an expanded condition;

a plurality of suspension lines having first ends connected to the periphery of the canopy;

first and second risers connected by their first ends to the upper surface of the aircraft on either side of the longitudinal axis and by their second ends to second ends of the suspension lines;

first means to releasably restrain the parachute in said stored condition on the upper surface of the aircraft;

a second means to cause said first means to release said canopy from said stored condition; and wherein the aircraft has a specific center of drag located between the center of gravity and the rear end, the first and second risers being attached to said aircraft at a point located between the front end and the center of gravity at a distance from the center of gravity, such that when said canopy is in said expanded condition, a moment about the center of gravity caused by drag of the canopy is equal to a moment about the center of gravity caused by drag of the aircraft as the aircraft falls.

2. The aircraft as set forth in claim 1 further comprising an elastic member connecting the risers to the suspension lines.

3. The aircraft as set forth in claim 2 wherein said elastic member is in the form of a ring.

4. The aircraft as set forth in claim 1 wherein said first means comprises
   hooks mounted on the upper surface of the aircraft on either side of the longitudinal axis just ahead of said canopy of said parachute assembly; and
   a retention member extending from the rear of the aircraft forward over said canopy and looping under said hooks and having its ends secured to the rear of the aircraft.

5. The aircraft as set forth in claim 4 wherein said second means is mounted on the tail end of the aircraft in contact with said retention member.

6. The aircraft as set forth in claim 5 wherein said second means is an electrically actuated squib and said retention member is made of cotton.

7. The aircraft as set forth in claim 1, or 2, or 3, or 4, or 5, or 6, wherein when said canopy is in said stored condition and released by said first means, aerodynamic forces will move said canopy to said expanded condition.

8. The aircraft as set forth in claim 1, wherein said canopy is hexagonal shaped and there are six suspension lines.

9. In an aircraft having a front end, a rear end, a longitudinal axis, a center of gravity and an upper surface, a parachute system comprising:
   a storable parachute mounted on the upper surface of the aircraft comprising:
      a canopy having a stored condition and an expanded condition;
      a plurality of suspension lines having first ends connected to the periphery of the canopy;
      an elastic member attached to the second ends of the suspension lines;
      first and second risers connected by their first ends to the upper surface of the aircraft between the front end and center of gravity on either side of the longitudinal axis and by their second ends to the elastic member;
   first means to releasably restrain the parachute in said stored condition on the upper surface of the aircraft;
   second means to cause said first means to release said canopy from said stored condition; and wherein
      the aircraft has a specific center of drag located between the center of gravity and the rear end said parachute attached to said aircraft at a point located between the front end and the center of gravity at a distance from the center of gravity, such that when said canopy is in said expanded condition, a moment about the center of gravity caused by the drag of the canopy is equal to a moment about the center of gravity caused by drag of the aircraft as the aircraft falls.

10. The aircraft as set forth in claim 9 wherein said elastic member is in the form of a ring.

11. The aircraft as set forth in claim 9 wherein said canopy is vented.

12. The aircraft as set forth in claim 9 wherein said first means comprises
   hooks mounted on the upper surface of the aircraft on either side of the longitudinal axis just ahead of said canopy of said parachute assembly; and
   a retention cable extending from the rear of the aircraft forward over said canopy and looping under said hooks and having its ends secured to the rear of the aircraft.

13. The aircraft as set forth in claim 12 wherein said second means is mounted on the tail end of the aircraft in contact with said retention cable.

14. The aircraft as set forth in claim 13 wherein said second means is an electrically actuated squib and said retention cable is made of cotton.

15. The aircraft as set forth in claim 9, or 10, or 11, or 12, or 13, or 14, wherein said canopy when in said stored condition and released by said first means, aerodynamic forces will move said canopy to said expanded condition.

16. The aircraft as set forth in claim 9, wherein said canopy is hexagonal shaped and there are six suspension lines.

17. An aircraft having a front end, a rear end, a longitudinal axis, a center of gravity, an upper surface, and a parachute assembly, the parachute assembly comprising:
   a canopy having a stored condition and an expanded condition;
   a plurality of suspension lines having first ends connected to the periphery of the canopy;
   an elastic member attached to the second ends of the suspension lines; and
   first and second risers connected by their first ends to the upper surface of the aircraft and by their second ends to the elastic member;
   first means to releasably restrain the parachute in said stored condition on the upper surface of the aircraft;
   second means for causing said first means to release said canopy from said stored condition; and wherein
      said aircraft has a specific center of gravity and a specific center of drag located between the center of gravity and the rear end said parachute attached to said aircraft at a point located between the front end and the center of gravity at a distance from the center of gravity, such that when said canopy is in said expanded condition, a moment about the center of gravity caused by drag of the canopy is equal to a moment caused by drag of the aircraft as the aircraft falls.

18. The aircraft as set forth in claim 17 wherein said elastic member is in the form of a ring.

19. The aircraft as set forth in claim 17 wherein said canopy is vented.

20. The aircraft as set forth in claim 17 wherein said first means comprises:
   hooks mounted on the upper surface of the aircraft on either side of the longitudinal axis just ahead of said canopy of said parachute assembly; and
   a retention cable extending from the rear of the aircraft forward over said canopy and looping under said hooks and having its ends secured to the rear of the aircraft.

21. The aircraft as set forth in claim 20 wherein said second means is mounted on the tail end of the aircraft in contact with said retention cable.

22. The aircraft as set forth in claim 21 wherein said second means is an electrically actuated squib and said retention cable is made of cotton.

23. The aircraft as set forth in claim 17 or 18, or 19, or 20, or 21, or 22, wherein said canopy when in said stored condition and released by said first means, aerodynamic forces will move said canopy to said expanded condition.

24. The aircraft as set forth in claim 17, wherein said canopy is hexagonal shaped and there are six suspension lines.

25. In an aircraft having a front end, a rear end, an upper surface, and a center of gravity, a parachute system comprising:

a parachute canopy having a stored condition, in which the canopy is deflated, and an expanded condition, in which the canopy is inflated; wherein the aircraft has a specific center of drag located between the center of gravity and the rear end, the canopy being attached to said aircraft at a point located between the front end and the center of gravity at a distance from the center of gravity, such that when said canopy is in said expanded condition, a moment about the center of gravity caused by drag of the canopy is equal to a moment about the center of gravity caused by drag of the aircraft as the aircraft falls.

26. The aircraft of claim 25, further comprising:

a retention member that restrains the canopy in the stored condition in engagement with the upper surface of the aircraft, the stored canopy being exposed to airflow across the surface during flight of the aircraft.

27. The aircraft of claim 25, further comprising:

a retention line tautly extending over said canopy and fastened to the aircraft to hold the canopy in the stored position; and an electrically actuated squib for parting said retention line to deploy said canopy.

28. In an aircraft, a parachute system comprising:

a parachute canopy attached to the aircraft, the canopy being deployable from a stored condition, in which the canopy is deflated, to an expanded condition, in which the canopy is inflated;

a retention line tautly extending over said canopy and fastened to the aircraft to hold the canopy in the stored condition and against an outer surface of the aircraft; and an electrically actuated squib for parting said retention line to deploy said canopy.

29. A method for providing controlled descent of an aircraft with a parachute, the method comprising:

(a) providing a parachute canopy stored in a deflated condition adjacent a surface of the aircraft;

(b) attaching a periphery of the canopy to at least one point on the aircraft forward of a center of gravity of the aircraft;

(c) releasing the canopy from the stored position, the canopy inflating and slowing a descent of the aircraft due to drag on the canopy;

(d) opposing a moment about the center of gravity caused by drag of the aircraft with a moment about the center of gravity caused by the drag of the canopy; causing the aircraft to descend with a generally horizontal attitude.

* * * * *